Patented Apr. 10, 1951

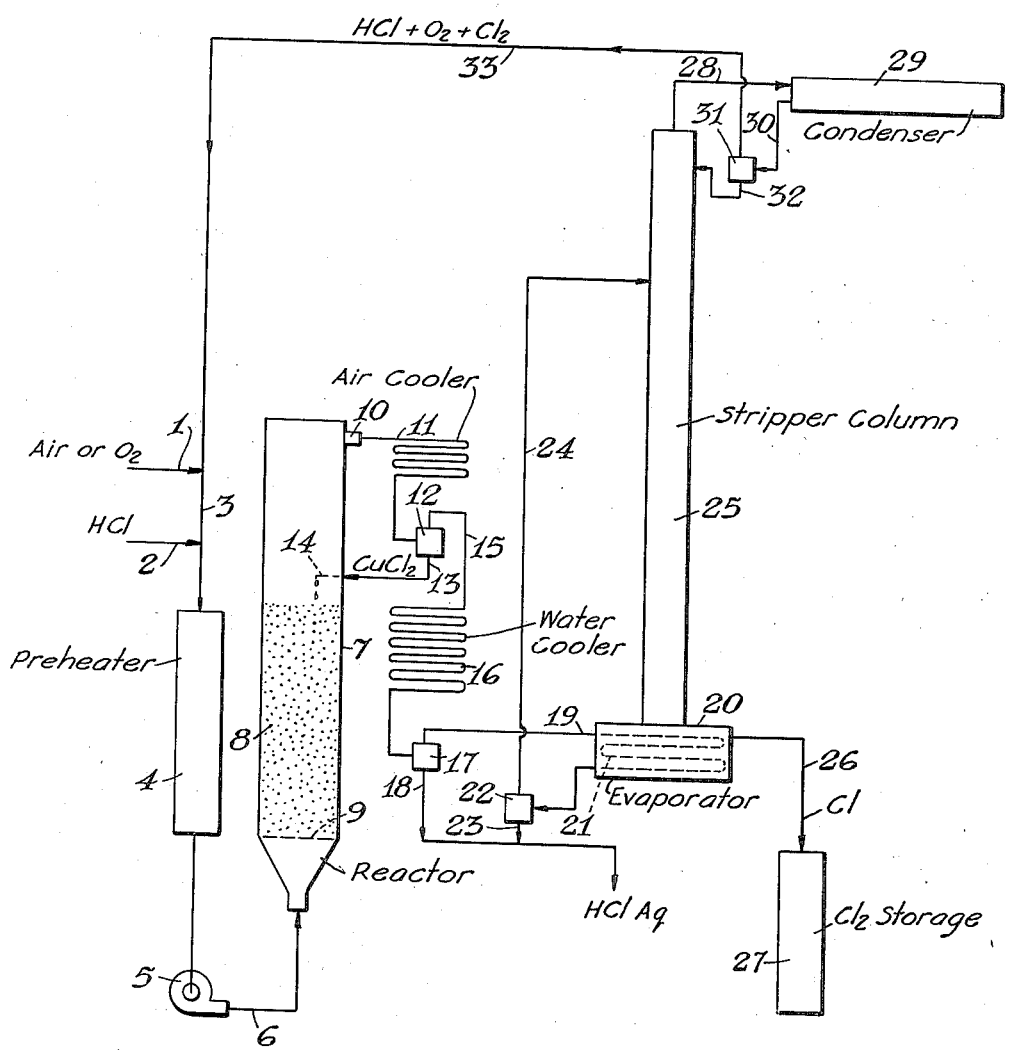

2,547,928

UNITED STATES PATENT OFFICE 2,547,928

PROCESS FOR MANUFACTURE OF CHLORINE BY OXIDATION OF HYDROGEN CHLORIDE

Clyde W. Davis and Forrest A. Ehlers, Antioch, and Roger G. Ellis, Walnut Creek, Calif., assignors to The Dow Chemical Company, Midland, Mich., a corporation of Delaware Application February 13, 1947, Serial No. 728,280

5 Claims. (Cl. 23—219)

This invention relates to improvements in the manufacture of chlorine by the "Deacon process." Although the Deacon process was developed and commercially practiced at an early date, it was not able to compete successfully with the electrolytic chlorine process, and has been largely supplanted by the latter. The Deacon process depends upon the oxidation of hydrogen chloride by air or oxygen, in the presence of a catalyst, according to the theoretical equation:

$$4HCl + O_2 \rightleftharpoons 2Cl_2 + 2H_2O$$

The reaction is reversible and its degree of completeness is governed according to an equilibrium which varies with the reaction temperature, as is well known. A catalyst is required in order to secure a practical reaction rate at a temperature corresponding to favorable equilibrium conditions. The usual catalyst employed is cupric chloride, $CuCl_2$, which is deposited on an inert porous carrier, such as broken fire brick or the like, forming an active contact mass. Various promoters for the cupric chloride catalyst, and also other catalysts, have been proposed, but none have been found which materially improve the operation of the process or are equal to cupric chloride, when the latter is used under the most favorable conditions. Optimum temperature conditions for the process are generally found to be within a narrow range of about 450° to 475° C., within which the conversion of hydrogen chloride to chlorine is on the order of about 60 to 70 per cent.

The lack of commercial success of the process, in competition with the electrolytic chlorine process, is due in part to the inability of the contact mass to retain its activity for any considerable period of time. At the operating temperature cupric chloride is slowly volatile, so that it is gradually lost by vaporization. When operating with a fixed contact bed, temperature control is difficult, due to the development of "hot spots" in the bed, which grow and spread, causing not only uneven reaction within the bed but also migration of the catalyst from the hotter to the cooler zones within the bed by volatilization and redeposition. Under aggravated conditions such migration of the catalyst may cause stoppage of gas flow through the bed. There is no practical way of maintaining uniform temperature or reaction rate throughout a fixed contact bed, and the bed, through loss of cupric chloride, loses activity at a fairly rapid rate. One of the difficult problems that has engaged the attention of the art has been to devise ways of maintaining the activity of the contact bed, either by replenishing the catalyst or preventing its loss by volatilization. To our knowledge no successful solution of the problem has heretofore been achieved.

It is among the objects of the present invention to provide a solution of the aforesaid problem in such way that uniform temperature may be maintained within the contact body through an improved heat transfer, and activity of the catalyst may be maintained by constant replacement of losses, while at the same time securing uniform distribution of the catalyst throughout the contact mass. Another object is to improve the efficiency of the catalyst and provide for greater uniformity of operation of the process. A further object is to provide an improved method of depositing the cupric chloride catalyst upon the carrier. These and other objects and advantages of the invention will appear from the following description, taken in connection with the annexed drawing, in which the single figure is a diagrammatic representation of an apparatus for carrying out the improved process of the invention.

According to the invention the reaction of hydrogen chloride and oxygen is carried out in contact with a granular contact mass which is maintained in a fluidized condition by the flow of the reaction gases through the mass. Such mode of operation, under suitable conditions as hereinafter described, leads to the maintenance of a substantially uniform temperature throughout the reaction zone and thus avoids many of the difficulties that in the past have attended the use of a stationary contact bed.

A fluidized condition is produced in a mass of granular particles by passing a gas through the mass at a velocity such that the gas is broken up into bubbles, in a similar manner as when a gas is passed into a body of liquid. A fluidized bed has a fluctuating or "boiling" surface, due to the continual escape of gas bubbles. Bubble formation is affected by both the size of the particles and the velocity of the gas. A certain head or back pressure, hence depth of bed, is also necessary in order to cause bubble formation at any particular gas velocity. That is, the depth must be sufficient to prevent the gas from spurting through the bed instead of being broken up into bubbles, but beyond that the fluidizing action of the gas appears to be substantially independent of the depth of the bed. The numerical values of the various factors are low. For illustration, at a static bed depth of 10 inches or more for particles on the order of about 30 to 50 screen mesh size a gas velocity of about 0.25 foot per second is sufficient to fluidize the bed, where the diameter of the bed is great enough, about 4 inches or more, to avoid the effect of wall friction in the container. Fluidization causes an apparent expansion of the bed, so that the fluid depth is greater than its static depth. In the foregoing example the fluid depth of the bed is from 30 to 50 per cent greater than its static depth. As the gas velocity increases the bubbles in the bed tend to coalesce and increase in size, with a corresponding increase in fluid depth.

In a fluidized bed the gas velocity required to maintain this condition is only a small fraction of the free settling velocity of the particles or of the gas velocity required to suspend the individual particles in the gas stream and prevent their return by gravity.

Although we have investigated various catalysts and numerous catalyst compositions, such as have been disclosed in the prior art, we have found that cupric chloride is the most satisfactory for the purpose and gives the best and most consistent results. The cupric chloride catalyst is deposited upon a carrier consisting of a granular porous inert refractory material of sufficient hardness to be resistant to attrition when a mass of the particles is maintained in a fluidized condition. A body of the carrier granules on which the catalyst has been deposited is placed in an upright reactor chamber. The reactor has an inlet for the feed gases at the bottom, an outlet for exit gases at the top, and sufficient height is allowed above the granular body to allow for expansion when it is fluidized and to provide clear space above for settling particles which may be thrown up above the level of the fluidized mass.

The feed gases, consisting of a mixture of dry hydrogen chloride and air or oxygen, are admitted through the inlet at a velocity sufficient to fluidize the body of catalyst. The minimum gas velocity required for fluidizing is low, as already explained. The depth of the bed should be such as to permit a satisfactorily fluidized condition of the catalyst body to be achieved and to provide sufficient contact time for substantial conversion of hydrogen chloride to chlorine at the velocity and temperature used, the higher the temperature, within operative limits, the shorter the contact time required. A superficial contact time of about 0.5 to 5 seconds or more is sufficient under usual operating conditions.

The temperature of the reaction zone is maintained between about 300° and 600° C., preferably about 450° to 500° C. The reaction is exothermic and theoretically produces more than sufficient heat to maintain the temperature within the desired range, when oxygen is used as the oxidizing gas. When air is employed, it is necessary to preheat the feed gases prior to their introduction into the reactor. A suitable preheat temperature is about 200° to 300° C., depending upon other operating conditions and the amount of heat losses from the reactor. The reactor is to be suitably insulated against heat losses. Heating means of any desired type may be provided for bringing the reactor up to reaction temperature, if necessary, or to aid in maintaining the temperature.

Under properly regulated conditions the reaction gives a high degree of conversion of the hydrogen chloride to chlorine, in accordance with the theoretical equilibrium at the reaction temperature. The exit gases from the reactor consist of a mixture of hydrogen chloride, oxygen, chlorine and water vapor, and also nitrogen, if air is used as the source of oxygen. The exit gases carry away a small amount of cupric chloride vapors, as the prior art shows. It is important to recover this vaporized cupric chloride and return it to the contact body. This is accomplished in our process by first cooling the hot exit gases just sufficiently to condense a small amount of water as a concentrated hydrochloric acid solution, which absorbs and dissolves the cupric chloride vapors. The acid solution of cupric chloride is returned to the reactor, continuously or intermittently, where it is caused to flow on to the surface of the fluidized contact mass and is therein absorbed, as will be more particularly described hereinafter. In this way the activity of the contact mass is maintained against substantial loss over a long period of continuous operation.

The partially cooled reaction gases, after separation of the condensed solution of cupric chloride, are further cooled and treated in any suitable manner known to the art for separation of chlorine from the other components of the mixture. For example, the gases may be cooled sufficiently to condense the remainder of the water contained in them as a concentrated hydrochloric acid solution of, say, 35 per cent strength. In normal operation there is more than sufficient hydrogen chloride in the gases to produce a 35 per cent solution with all of the water content thereof. After separation of the aqueous hydrochloric acid solution the residual mixture containing hydrogen chloride, oxygen and chlorine is refrigerated to liquefy the chlorine and the liquid is fractionated to separate it from the other components of the mixture, which may be returned for addition to the feed gases, or otherwise disposed of. Another method of recovering chlorine from the partially cooled reaction gases after separation of the cupric chloride, which is particularly applicable when air is used as the source of oxygen, is to scrub the gases with a refrigerated aqueous hydrochloric acid to remove hydrogen chloride and water, followed by liquefaction of the chlorine to separate the latter from the oxygen and nitrogen.

A particular advantage of utilizing a fluidized contact mass lies in the ability thus to maintain therein a uniform reaction temperature. The particles are in constant motion and migrate rapidly to all parts of the mass. We have observed that, under fluidizing conditions as herein described, the circulation is so rapid in a bed of usual depth that an initially stratified mass is completely and uniformly mixed in less than one minute. Such continuous circulation of the particles in the fluidized mass produces and maintains a uniform distribution of heat and eliminates the prior art difficulties caused by hot spots and slow heat transfer within a stationary bed. It also tends to maintain a uniform distribution of the catalyst on the carrier, regardless of vaporization losses or additions of cupric chloride from or to the mass and eliminates the troubles in stationary catalyst beds due to migration of the cupric chloride by vaporization and redeposition within the bed.

As a carrier for the cupric chloride, suitable inert materials are porous refractory siliceous bodies, such as pumice, diatomaceous earth, silica gel, fire brick, etc. We have found that certain natural diatomaceous earth products known as Celite or Sil-o-cel are well adapted for the purpose. Of particular advantage is a grade of product known as Celite IX, which has a degree of hardness that makes it highly resistant to attrition in use. The carrier material is reduced to a fine granular state, a preferred size being that which passes a 30 mesh sieve and is retained on a 50 mesh sieve (identified as −30+50 size). However, coarser or finer material may be used, although material finer than 100 mesh is much less desirable, and that finer than 200 mesh is too fine for practical use and is carried away as dust by the reaction gases.

The cupric chloride may be deposited on the carrier particles in various ways. One method is to wet the porous carrier with sufficient solution of cupric chloride to impregnate the porous particles, and then evaporate off the water, leaving a deposit of the cupric chloride in the pores and on the surface of the particles. A more advantageous method, and one which gives a greatly superior contact mass, utilizes a fluidizing procedure. A quantity of the carrier particles is fluidized in a chamber, while a solution of cupric chloride is caused to drip on to the surface of the fluidized mass at a temperature sufficient to flash-evaporate the water until the particles have acquired the desired content of the cupric chloride. This method is easily performed and produces a uniform deposit on the carrier particles. Surprisingly, the contact mass is more active when prepared in this way, and requires a lower copper content for acceptable activity than one prepared by immersion in a solution of the salt, as will be shown. This fluidizing procedure for preparing the contact mass is the same in principle as that employed in operation of the process, as described above, for replenishing the volatilization losses of the catalyst in use.

The amount of cupric chloride to be deposited on the carrier should be held within certain limits. Too low a copper content means lowered activity, while too high a copper content leads to trouble, because the particles tend to stick together at the reaction temperature, thus causing loss of fluidity. Such sticking of contact particles is believed to be caused by the deposition of too heavy a layer of cupric chloride on the outer surface of the particles. At a reaction temperature of 450° to 500° C. this layer may soften sufficiently to act as an adhesive to stick the particles together. The practical limits for cupric chloride content of the contact mass depend somewhat upon the size of the particles and the manner in which the cupric chloride has been deposited on them. For particles prepared by the "drip" fluidizing method described above, a $CuCl_2$ content of between about 3 and 15 per cent gives good conversion of hydrogen chloride to chlorine.

The operation of a complete process embodying the invention may be shown by reference to the drawing. Oxygen is introduced through a line 1, and hydrogen chloride through a line 2, into a feed line 3, wherein the gases are mixed and conducted to a preheater 4. In the preheater the mixed gases are heated to a temperature, e. g. between 200° and 300° C., sufficient to maintain the subsequent reaction temperature under particular process conditions. The preheated gases are forwarded by pump 5 and line 6 to the base of a conical-bottomed upright reactor 7. In the reactor is a contact body 8, composed of cupric chloride deposited on small particles of a carrier, supported on a perforated plate or grill 9. The depth of the contact body is sufficient to provide a contact time of about 1 to 3 seconds for the reaction gases. The gases are admitted to the reactor at a velocity sufficient to fluidize the contact body and under a pressure sufficient to overcome the head of catalyst and the pressure drop through the system. Under these conditions the contact body is fluidized with an expansion of from about 20 to about 50 per cent over its static volume.

The reaction gases are heated to reaction temperature within the contact body, the feed temperature of the gas being preferably regulated so as to maintain the reaction temperature at about 475° C. The hot reaction gases pass from the reactor through outlet 10 to an air-cooled condenser 11, in which they are cooled sufficiently to condense a portion of the water and hydrogen chloride therein as a strong aqueous solution, which absorbs and dissolves the cupric chloride vapors contained in the exit gases. The condensate is separated from the remaining gases in separator 12.

The nearly saturated acid solution of cupric chloride is returned continuously or intermittently by pipe 13 to reactor 7 at a point somewhat above the fluidized level of the contact body. Pipe 13 terminates inside the reactor in a drip nozzle 14, through which the solution is dripped on to the fluidized body. Water and hydrogen chloride are flashed off, while cupric chloride is deposited on the carrier particles. Under the prevailing fluidized condition of the mass, the deposition of cupric chloride on the carrier particles and their distribution in the fluidized body are fairly uniform, while the cupric chloride content of the particles may be held within close limits.

The uncondensed vapors and gases from separator 12 pass through line 15 to a water-cooled condenser 16 in which most of the remaining water vapor is condensed as a hydrochloric acid solution of about 30 to 35 per cent concentration. The acid solution is separated from residual gases in separator 17 and removed through pipe 18.

The gases from separator 17, containing chlorine, oxygen and residual hydrogen chloride, pass at a temperature of about 40° C. through line 19 to a still 20, where they are conducted through a refrigerating coil 21 which is cooled by liquid chlorine in the still. The cooled gases at about −20° C. pass to trap 22, where a small amount of liquid aqueous hydrochloric acid is separated and removed through line 23, which may conveniently be connected with line 18. The cooled gases pass through line 24 to an upper section of stripper column 25, which is connected with still 20. In the column most of the chlorine is liquefied and flows down into the still, where the liquid is boiled to strip out dissolved gases. Purified liquid chlorine is withdrawn from still 20 through line 26 to a receiver 27. Uncondensed gases from the top of column 25 are removed through line 28 and led to a refrigerated condenser 29, where they are cooled to about −60° C. The refrigerated mixture passes through line 30 to trap 31, where liquid condensate is separated and returned through line 32 to the head of column 25 as reflux. The uncondensed gases from the trap 31, containing oxygen and residual chlorine and hydrogen chloride, are taken off through line 33, which is connected to line 3, and are added to the feed gases entering the system.

When air is used as the source of oxygen for the process, operation is the same, except that the exit gases from trap 31 are preferably vented instead of being recycled. In such case the vent gases may be further treated by known means to recover residual chlorine therein. Also some water should be added to the gases in condenser 16, sufficient for substantially complete absorption of hydrogen chloride in the condensate.

In starting operation of the process as described, the contact mass may be prepared in situ in reactor 7 according to procedure already mentioned. A body of carrier particles is charged into the reactor, which is then fluidized by passing a gas through the mass, while a solution of cupric chloride is dripped on to the upper surface of the fluidized mass until a sufficient deposit of cupric chloride has been built up on the particles. As the fluidizing gas the usual feed gas mixture may be used, or air or other gas may be employed, if desired. The temperature at which the operation is carried out needs be only high enough to flash-evaporate water from the cupric chloride solution that is dripped on to the fluidized carrier particles, but any temperature up to temperatures in the operating range of the principal process may be used. The strength of the cupric chloride solution used is not critical, although a concentration of from 10 to 30 per cent of $CuCl_2$ has been found suitable.

A contact mass prepared in the manner just described has been found much superior to one formed in the conventional manner by immersion of the carrier particles in a solution of cupric chloride and subsequent removal of water by evaporation. To illustrate this superiority, the following comparative tests were made. As carrier Celite IX of −30 +50 mesh was used. Two lots (Nos. 1 and 2) of contact particles were made by the "drip" method, as described, and one lot (No. 3) by the conventional immersion method. Each lot contained 9.1 per cent $CuCl_2$ by weight. 200 grams of each lot was placed in a 2 inch diameter tubular reactor, in which the static depth of the bed was about 10 inches. In a series of runs, 18 gram mols per hour of a gas mixture having the composition by volume:

HCl—59.6 per cent
$O_2$—29.3 per cent
$Cl_2$—11.1 per cent was passed through each bed at a fluidizing velocity at temperatures of 500°, 475°, 450°, 425°, 400°, respectively, and the percentage conversion of HCl to $Cl_2$ was determined, as shown by Table I.

*Table I*

| Catalyst Temp. | No. 1 Per Cent Conv. | No. 2 Per Cent Conv. | No. 3 Per Cent Conv. |
|---|---|---|---|
| 500° | 70 | 70 | |
| 475° | 69 | 70 | 47 |
| 450° | 62 | 62 | 22 |
| 425° | 31 | 41 | 10 |
| 400° | 15 | 17 | 3 |

The enhanced activity of the contact mass prepared by the "drip" method herein described is believed to be due, at least in large part, to the condition that the deposit of cupric chloride is formed principally on the surface of the carrier or in the pores near the surface, whereas in the conventional immersion method the carrier particles are impregnated substantially throughout. The cupric chloride on or near the surface of the carrier particles is that which is mostly effective to catalyze the reaction, while any that is deposited more deeply in the particles is mostly out of contact with the reaction gases and is ineffective. The correctness of this theory is supported by our repeated observation that a contact mass prepared by the "drip" method is more effective at a lower total content of $CuCl_2$ than one prepared in the conventional way. There may be other factors than the one mentioned, which determine the superior activity of the contact mass prepared by our improved method, which we have not as yet ascertained, but the above explanation appears to agree with the observed facts.

It is to be remarked that the continuous operation of our improved "Deacon" process with regeneration of the contact mass in the manner described eventually produces a mass which is practically identical with one that has been prepared by the "drip" method, regardless of how it was initially prepared.

The durability of the contact mass for long continued operation depends upon the physical properties of the material selected as the carrier. The fluidizing procedure inevitably causes more or less attrition of the carrier particles, with formation of fines which are less suitable for the purpose than larger particles, and may be lost through dust carryover in the reactor. The carrier must have sufficient hardness as well as cohesion to resist attrition as far as practicable. It must also be resistant to thermal shock, such as it is subjected to by our method of regeneration by introducing an aqueous cupric chloride solution into the hot fluidized mass in the reactor. As previously stated, diatomaceous earth in general possesses the required properties in greater degree than any other material that we have found, in particular the grade known as Celite IX, although other grades have been found to be nearly as good. Our experience with this carrier has shown that there is a gradual size reduction of the particles during operation of the process, and a small dust loss. For example, starting with particles of −30 +50 mesh, with air velocity at 0.5 F. P. S., about one-half of the mass will pass a 50 mesh sieve after 120 hours of continuous operation, while the dust loss is on the order of about 0.15 per cent per hour. This indicates the periodical addition to the fluidized bed of sufficient amounts of fresh particles of suitable size, to make up for the gradual loss by attrition.

In carrying out the process the proportions of hydrogen chloride and oxygen in the reaction gases may be varied considerably from the theoretical ratio of 4/1. According to mass action principles an excess of either hydrogen chloride or oxygen would tend to force the reaction in the desired direction. From the standpoint of product recovery, it is more advantageous to work with a theoretical excess of oxygen. In the operation of a continuous process, as described, the recycle of uncondensed reaction gases, including chlorine as well as oxygen and hydrogen chloride, is to be taken into account in determining the proportions of the feed gases. As an example, without implying any limitation, a suitable gas mixture to be fed to the reactor, composed of both fresh and recycle gases, may have a composition of about 60 per cent HCl, 30 per cent $O_2$, and 10 per cent $Cl_2$. When air is used as the source of oxygen, the proportions are adjusted for the nitrogen content of the air, which acts as an inert diluent. The presence of nitrogen in the reaction gases does not change the principle of the process or its operation, although it does modify the heat and material balances and the engineering calculations in the design of a working plant.

Our improved process, as described, is capable of continuous operation over long periods of time, and eliminates or greatly reduces the difficulties heretofore encountered in the use of a fixed catalyst bed. It provides an effective method of maintaining the activity of the contact mass to compensate for unavoidable losses of cupric chloride by volatilization, as well as making possible for the first time in the art a uniform distribution of heat within the reaction zone.

The following is an illustrative example of the operation of our improved process, without thereby implying any limitation other than is contained in the foregoing general description and in the appended claims.

*Example*

In an insulated vertical reactor having a height of 44 inches, externally heated by a winding of electrical resistance wire, was placed a 10 inch deep bed of carrier particles composed of Celite IX of −80 +100 mesh size. A feed gas composition consisting of 29.3 per cent $O_2$, 59.6 per cent HCl and 11.1 per cent $Cl_2$, by volume, was introduced below the bed at a pressure of 0.8 to 1.2 inch Hg above atmosphere, equivalent to a velocity of about 0.25 foot per second, which was sufficient to fluidize the bed with an increase in apparent volume of 50 per cent. The superficial contact time was approximately 3.4 seconds, i. e. contact time calculated on the basis of residence in a 10 inch depth of empty reactor at feed velocity. The feed gas was preheated to a temperature of about 250° C., and sufficient heat was supplied to the reactor to maintain the temperature therein at about 475° C.

The carrier was first activated by dripping on to the fluidized surface a 10 per cent $CuCl_2$ solution until the particles had a content of 4.25 per cent $CuCl_2$. Thereafter the reaction was continued, the exist gases from the reactor being cooled in a first stage to condense a strong hydrochloric acid solution of $CuCl_2$, and then in a second stage being further condensed to remove water and recover the product. The condensed $CuCl_2$ solution was continuously returned to the reactor and dripped on to the fluidized surface of the catalyst while the reaction continued for 185 hours. The $CuCl_2$ content of the contact mass remained at 4.24 per cent. Thereupon, without interrupting the process, operation was continued in similar manner, except that no $CuCl_2$ was returned to the contact mass. At 200 hours the conversion was 67 per cent as compared with an initial conversion of 70 per cent. At 304 hours the $CuCl_2$ content of the contact mass had been reduced to 3.17 per cent, and the conversion of HCl to $Cl_2$ had been reduced to 58 per cent. The accumulated $CuCl_2$ solution was then returned to the contact mass as rapidly as possible, while operation of the process continued uninterruptedly. After 6½ hours operation in such manner, the $CuCl_2$ content of the mass had risen to 3.48 per cent, and the conversion of HCl to $Cl_2$ had risen to 65 per cent.

In a similar run for comparison, the operation was conducted as just described, except that the contact mass was previously prepared by the immersion method with a total $CuCl_2$ content of 5.52 per cent, and no $CuCl_2$ solution was returned to the carrier during the run. Under these conditions after 55½ hours the $CuCl_2$ content of the mass had fallen to 4.77 per cent, and the conversion of HCl to $Cl_2$ had fallen from an initial value of 68 per cent to a final value of 36 per cent.

It is seen from the foregoing example that the $CuCl_2$ content of the contact mass cannot be taken alone as a measure of its activity, since much depends upon the proportion of the $CuCl_2$ on the carrier which is available or accessible for actual contact with the reaction gases. In a particular case, however, when the initial $CuCl_2$ content is progressively reduced by volatilization losses, a point is reached below which the activity falls off rapidly with continued reduction in its $CuCl_2$ content.

A direct comparison of our improved process with the prior art process of using a fixed catalyst bed is not feasible for reasons which are readily apparent. Indirect comparisons are less difficult. According to our experience in using a fixed contact bed containing cupric chloride on the usual carriers or any of numerous other catalysts heretofore proposed, at comparable temperatures and contact times, an equilibrium conversion of HCl to $Cl_2$ cannot be closely approached at 450°–475° C. but is reached only at temperatures above 500° at which the equilibrium is less favorable than at the lower temperatures. At such higher temperatures, of course, volatilization losses are greater, and the usefully active life of a catalyst is greatly shortened. For example, using the theoretical feed composition of $4HCl+O_2$, we tested a fixed contact bed composed of a mixture of 80 parts $CuCl_2$ and 20 parts NaCl deposited on Celite in amount of 37.5 per cent of the weight of the carrier. At a temperature of 450° C. the initial conversion of HCl to $Cl_2$ was 55.6 per cent, which gradually decreased to 41.7 per cent after 119 hours of continuous operation, as compared with a theoretical conversion of approximately 71.0 per cent at that temperature. At 550° C. an initial conversion of approximately 56 per cent was reduced to 28 per cent after only 44½ hours of continuous operation, as compared with a theoretical conversion of approximately 61 per cent at the temperature stated.

Although the invention has been particularly described for use with a contact mass composed of cupric chloride alone deposited on a carrier, it may also be used with other Deacon process catalyst compositions employing different catalytic metal salts or mixtures thereof with $CuCl_2$, such as have been disclosed in the prior art. An example of such other catalyst composition is the mixture of $CuCl_2$ and NaCl referred to above. We have investigated numerous such other catalysts containing a vaporizable metal compound, however, and have found none of them to be equal to $CuCl_2$ itself for use in our process. When other copper compounds are used for the purpose, instead of cupric chloride, the art has already found that they are eventually converted to $CuCl_2$ by the operation of the Deacon process.

We claim:

1. A process of producing chlorine which comprises forming a gaseous mixture of hydrogen chloride and oxygen-containing gas, preheating the same, passing the preheated mixture upwardly through a particulate body of a contact mass at a temperature between 300° and 600° C. and with a gas velocity sufficient to fluidize the body, said contact mass consisting of granular particles of a porous inert carrier on which is deposited a Deacon process catalyst composed of a metal compound slowly vaporizable at the reaction temperature, cooling the exit gases from the reaction zone to condense a portion of the water vapor therein and thereby absorb accompanying vapors of the metal compound, forming a hydrochloric acid solution of the compound, introducing such solution into the fluidized body of the contact mass to maintain the concentration of the metal compound therein, and separating chlorine from the residual gases and vapors from said partial condensation step.

2. A process of producing chlorine which comprises forming a gaseous mixture of hydrogen chloride and oxygen-containing gas, preheating the same, passing the preheated mixture upwardly through a particulate body of a contact mass at a temperature between 300° and 600° C. and with a velocity sufficient to fluidize the body, said contact mass consisting of granular particles of a porous inert carrier on which cupric chloride is deposited, cooling the exit gases from the reaction zone to condense a portion of the water vapor therein and thereby absorb accompanying vapors of cupric chloride, forming a hydrochloric acid solution thereof, introducing such solution into the fluidized body of the contact mass to maintain the concentration of cupric chloride therein, and separating chlorine from the residual gases and vapors from said partial condensation step.

3. A process of producing chlorine which comprises passing a preheated mixture of hydrogen chloride and oxygen-containing gas upwardly through a particulate body of a contact mass at a temperature between about 450° and about 500° C. and with a velocity sufficient to fluidize the body, said contact mass consisting of granular particles of a porous inert carrier on which is deposited from 3 to 15 per cent by weight of cupric chloride, cooling the exit gases from the reaction zone to condense a portion of the water vapor therein and thereby absorb accompanying vapors of cupric chloride, to form a hydrochloric acid solution thereof, introducing such solution into the fluidized body of the contact mass to maintain the concentration of cupric chloride therein, and separating chlorine from the residual gases and vapors from said partial condensation step.

4. The method of preparing a contact mass for use in converting hydrogen chloride to chlorine by the Deacon reaction, said contact mass consisting of an inert granular solid carrier having cupric chloride deposited thereon, which comprises passing a gas through a particulate body of the carrier at a velocity sufficient to fluidize the same, introducing into said fluidized body a solution of cupric chloride, while maintaining the temperature of the body at a point sufficient to flash-evaporate the solvent therefrom, and continuing the operation until the desired amount of cupric chloride has been deposited on the carrier.

5. In a process for converting hydrogen chloride to chlorine by the Deacon reaction, in which a gaseous mixture of hydrogen chloride and oxygen-containing gas is passed through a fluidized body of a contact mass consisting of granular particles of an inert solid carrier having cupric chloride deposited thereon at a temperature between 450° and 600° C., the method of maintaining the activity of said contact mass and recovering cupric chloride vaporized therefrom which comprises cooling the exit gases from the reaction zone to condense a portion of the same and form an aqueous hydrochloric acid solution containing absorbed cupric chloride, and returning such solution on to the surface of the fluidized contact mass in the reaction zone.

CLYDE W. DAVIS.
FORREST A. EHLERS.
ROGER G. ELLIS.

REFERENCES CITED

The following references are of record in the file of this patent:

UNITED STATES PATENTS

| Number | Name | Date |
|---|---|---|
| 1,984,380 | Odell | Dec. 18, 1934 |
| 2,204,733 | Miller | June 18, 1940 |
| 2,411,592 | Reeves | Nov. 26, 1946 |
| 2,415,152 | Thompson | Feb. 4, 1947 |
| 2,416,019 | Patterson | Feb. 18, 1947 |
| 2,418,930 | Gorin | Apr. 15, 1947 |
| 2,436,870 | Murphree | Mar. 2, 1948 |
| 2,444,289 | Gorin et al. | June 29, 1948 |
| 2,464,480 | Beck | Mar. 15, 1949 |